July 6, 1948.　　　B. R. GERULIS ET AL　　　2,444,821
VARIABLE SPEED MOTOR

Filed Sept. 23, 1946　　　　　　　　　　2 Sheets-Sheet 1

INVENTORS
BENEDICT R. GERULIS
HENRY GARVELINK
BY Liverance and Van Antwerp
ATTORNEYS INVENTORS
BENEDICT R. GERULIS
HENRY GARVELINK
BY Liverance and Van Antwerp
ATTORNEYS Patented July 6, 1948

2,444,821

UNITED STATES PATENT OFFICE 2,444,821

VARIABLE-SPEED MOTOR

Benedict R. Gerulis and Henry Garvelink, Grand Rapids, Mich.

Application September 23, 1946, Serial No. 698,650

4 Claims. (Cl. 172—36)

This invention relates to electric motors, and is more particularly concerned with an electric motor, the load carrying shaft of which may be driven at different speeds under constant torque, with an adjustment for varying the speed through all gradations of speed from its maximum downwardly to a point where it has no speed of rotation, and this without the use of rheostats and the employment of varying resistances used to control the current delivered to the motor.

In the motor of our development, not only is the rotor which turns the load carrying shaft rotatable about an axis but the stator is also rotatable about the same axis. Through the novel control which we have provided, the rotation of the stator and rotor in opposite directions to each other is variable from a maximum of each down to no rotation, the maximum rotation of the rotor occurring when the stator is at rest and of the stator with the motor at rest, and with both turning about the axis of rotation at intermediate stages of operation. The load carrying shaft connected to and turnable with the rotor is, therefore, subject to all of the variations of rotor speed stated. The means for accomplishing such functions and results is of a very practical, sturdy and dependable character. It is an object and purpose of the present invention to provide an electric motor as set forth and one which may be economically produced and readily manufactured and assembled.

Figure 1:
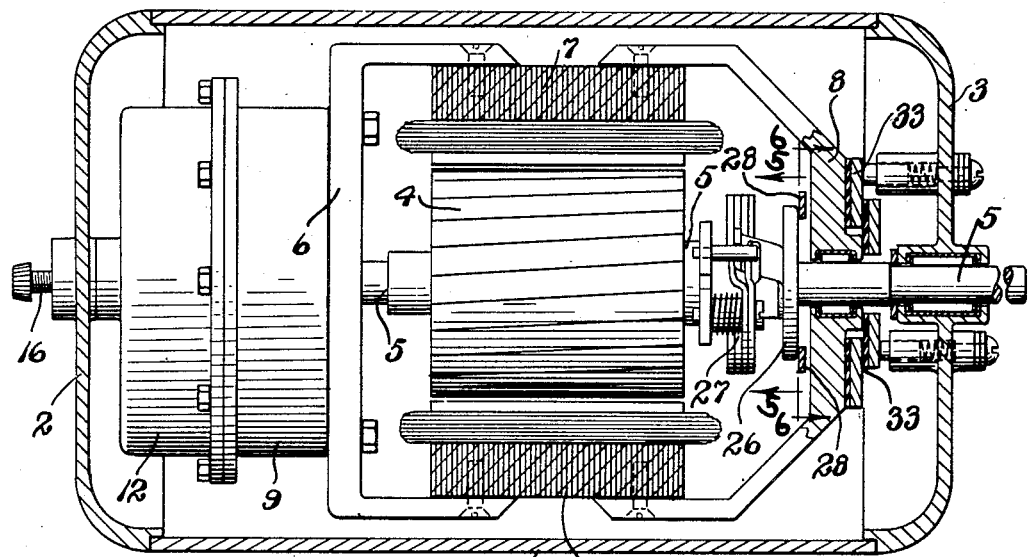

An understanding of the invention may be had from the following description, taken in connection with the accompanying drawings, in which, Fig. 1 is a partial longitudinal section and elevation longitudinally of the motor unit of our invention.

Figure 2:
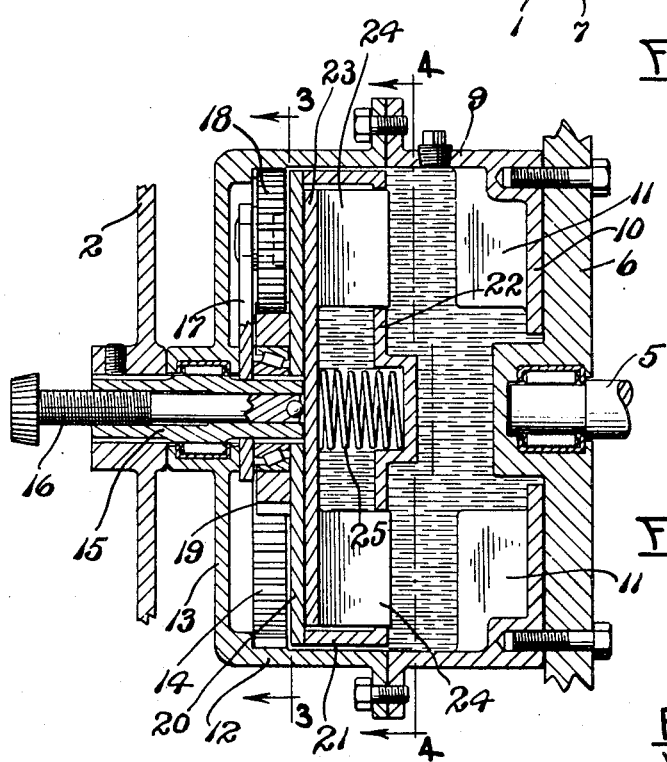

Fig. 2 is a longitudinal vertical section through the speed control mechanism.

Figure 3:
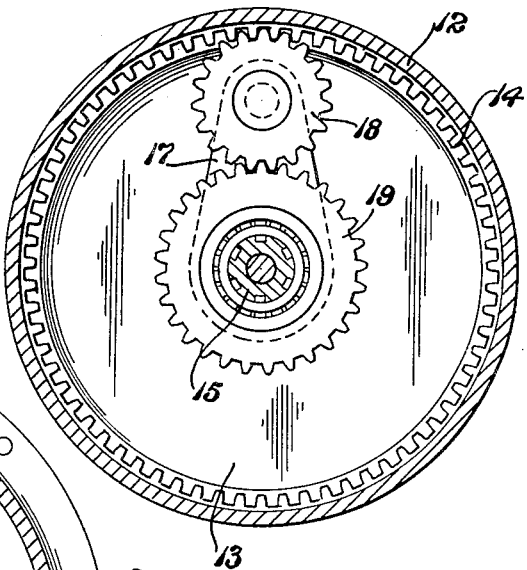
Figure 4:
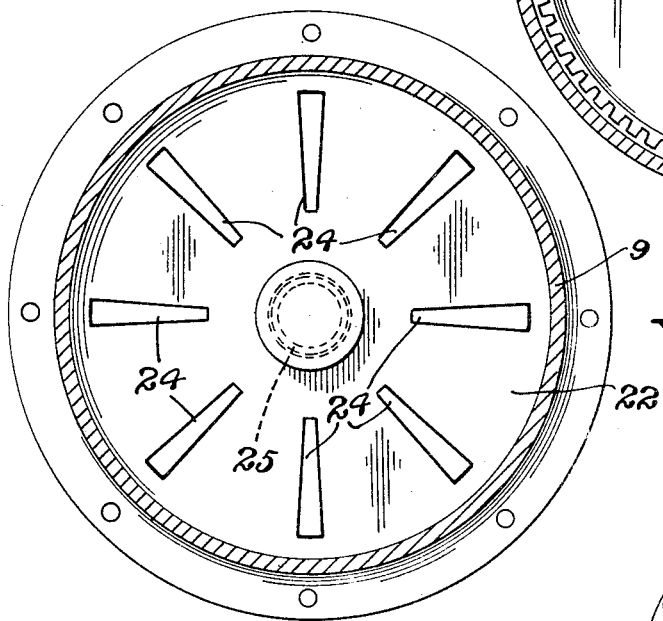
Figure 5:
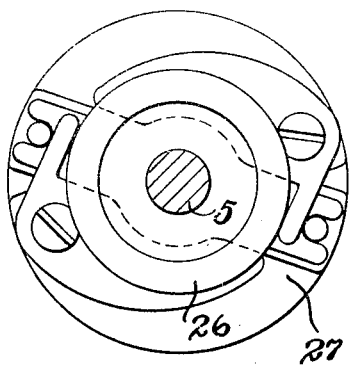
Figure 6:
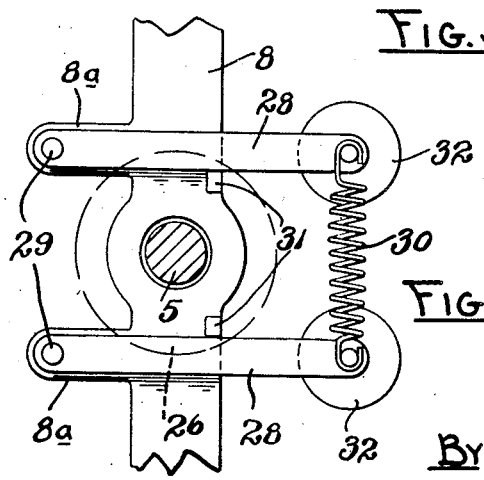

Figs. 3 and 4 are transverse vertical sections on the planes of lines 3—3 and 4—4 of Fig. 2, looking in the direction indicated, and Figs. 5 and 6 are vertical sections on the same plane looking in opposite directions, said plane being indicated by the lines 5—5 and 6—6 in Fig. 1.

Like reference characters refer to like parts in the different figures of the drawings.

The motor casing includes a cylinder 1, having opposite end closures 2 and 3, as shown in Fig. 1. The rotor 4 is on a horizontal shaft 5, at one end extending through suitable bearings on the end 3 of the casing, and it is such end of the shaft which is connected with the load to be driven thereby. The opposite end of the housing has a rotative mount in a suitable bearing in the cross member of a fork 6 from opposite ends of which arms extend in the same direction and are connected to the magnets 7 which surround the rotor. A second fork 8 is rotatably mounted on the shaft 5 beyond the opposite end of the rotor 4 and has spaced arms extending toward the arms of the fork 7 likewise connected with the magnets. This provides a stator mounted for free rotation with respect to and about the axis of the shaft 5; or conversely, the shaft 5 and the rotor connected therewith is freely rotatable about the longitudinal axis of the shaft with respect to the stator.

On the fork or frame member 6 of the stator, a housing is permanently mounted. The housing is made of two substantially cup-like parts or halves, one having a cylindrical wall 9 and a vertical side 10 which lies against the outside of the fork 6 and is secured thereto by cap screws or equivalent securing means. From the side 10, a plurality of integral vanes 11 extend into the housing, being disposed radially around the axis of the shaft 5 and terminating at their inner ends a short distance from the hub in which the end of the shaft 5 is mounted. The other part or half of the housing has a cylindrical wall 12 and an outer side 13, the two open ends of the two housing parts being provided with outwardly extending flanges which are secured together by screws to make a liquid tight housing. The wall 12 at its inner side is provided with an annular gear 14 as shown.

A sleeve 15 is keyed or otherwise permanently secured to the closing end 2 of the motor casing and extends through a central hub in the end 13 of the described housing, with suitable bearings so that the housing may turn about the sleeve. Said sleeve at its outer end portion is interiorly threaded. A rod 16 extends through the sleeve and at its outer portion is exteriorly threaded whereby it may be adjusted lengthwise through the sleeve. An arm 17 is keyed or otherwise securely connected with the sleeve within the housing extending radially outward toward the wall 12. A pinion 18 is mounted at the outer portion of the arm 17 and is in mesh with the annular gear 14. A gear 19 is mounted upon suitable bearings to turn freely about the sleeve 15, the gear 19 and the pinion 18 being in mesh.

The gear 19 is permanently connected to a circular plate 20 within the housing walls 12 which is secured to a cylindrical wall 21 which has, cast integral therewith, an inner plate 22 spaced from the plate 20, thereby providing a disc having spaced vertical sides and a chamber between said sides surrounded by the wall 21. Within the chamber a circular plate 23 is mounted from which a plurality of spaced radial vanes 24 extend and pass through slots made in the inner vertical plate or side 22. Normally the plate 23 is held against the side 20 of the disc structure described by a coiled compression spring 25 between the central portion of the side 22 and the plate 23. A roller thrust bearing is located between the inner end of the rod 16 and the outer side of the plate 23. On adjusting the rod 16 inwardly, spring 25 is compressed and the vanes 24 are moved toward the vanes 11. Such movement may continue until the adjacent edges of the vanes 24 and 11 are brought closely together and may be stopped at any desired intermediate position.

As both a rotor and stator are rotatable, means are provided for an automatic breaking of the usual starting circuit for the rotor so that the operating circuit may thereafter function, this in itself being old; and associated with it is an auxiliary means for the same purpose relative to the rotatable stator. The ring 26 is connected and associated with a centrifugal operating mechanism, indicated as a whole at 27, secured to the shaft 5 and which, upon the attainment of a predetermined speed of rotation, shifts the ring 26 to the left away from the bars 28 with which it is in contact engagement. The bars are located, one above and one below the shaft 5, and pivotally connected at one end at 29 on upper and lower arms 8a extending laterally from the fork 8. Said arms 28 are held normally by a tension spring 30 in parallel position by engaging against stops 31 on the fork 8 (Fig. 6). Each at its spring connected end is supplied with a weight 32. Upon either the rotor or the stator attaining a predetermined speed of movement the initial starting circuit is broken and the operating circuit comes into operation (detail not shown). When the stator reaches such speed of rotation, the bars 28 are swung about end pivots 29 away from each other and separate from the disk 26. The usual collector ring structure at 33 is mounted on the stator fork support 8, properly insulated therefrom.

With the electric motor construction as described, a load on the shaft 5 will tend to hold the rotor from turning. With the vanes 24 and 11 separated their greatest amounts, the stator will have its greatest freedom of movement, rotating about the common axis of the shaft 5 and sleeve 15, thereby driving the pinion 18 and gear 19 and rotating the vane carrying housing 24 in a direction opposite to the direction of the stator. By adjusting the screw 16 inwardly, vanes 24 are moved to any desired position relative to the vanes 11; and at the nearest approach substantially hold the stator from rotation. At intermediate positions the brake will be less effective and both the stator and rotor will turn about a common axis. The speed of the rotation of the rotor and the shaft 5, which drives any load connected therewith, will be at its maximum when the stator has been brought to or substantially to a stop. And its speed of rotation will decrease, controlled by the adjusted position of the vanes 24 in conformity to increasing speeds of the stator. Therefore, a progressively increasing or decreasing speed rotation of the shaft electric motor is attained without marked steps of change from one speed to the next speed but of continuously progressive nature.

The construction is of a sturdy, dependable, durable character. The adjustment for changes of speed of the motor shaft is by a simple turning of the rod 16 which is exceptionally simple and easy. The motor of our invention, in extensive tests and trial has proved completely satisfactory.

The invention is defined in the appended claims and is to be considered comprehensive of all forms of structure coming within their scope.

We claim:

1. An electric motor comprising, an enclosing casing having vertical ends, a rotor having a load carrying shaft extending through and rotatably mounted on one end of the casing, a stator around the rotor having an end rotatably mounted on said load carrying end of the rotor shaft within said casing, the other end of the rotor shaft being rotatably mounted on the opposite end of the stator, a housing secured to the last mentioned end of the stator, means for rotatably mounting the outer end portion of the housing on the opposite end of the casing, said stator and housing being rotatable about the axis of the rotor shaft, said housing being adapted to contain a liquid and said housing having a plurality of radial vanes extending into the housing from its inner end, a rotatable disk having spaced sides and a surrounding wall, a plate within said disk, radially located vanes on the plate extending through the inner side of the disk and adjustable toward and away from the first mentioned vanes, means for adjusting said plate and vanes to different positions, and means interposed between said disk and the housing for driving the disk and the vanes associated therewith from said housing in a direction opposite to the rotative movement of the housing and connected stator.

2. In an electric motor, a casing having vertical end closures therefor, a rotor having a horizontal shaft extending from both ends thereof, one end portion of the shaft extending through one end of the casing and having a rotatable mounting thereon, a stator within which the rotor is located including a frame having spaced vertical ends one end of which said end portion of the shaft extends therethrough, said stator at said end thereof being rotatably mounted on the shaft, the other end portion of the shaft extending to the opposite end of the stator, means for rotatably mounting the other end of said shaft on said last mentioned end of the stator, a housing having liquid therein secured to the last mentioned end of the stator, said housing at one end and within it having a plurality of spaced radial vanes, a rotatable member having a plurality of spaced radial vanes extending toward the first located within the housing, means for mounting said member for rotation, means for rotatably mounting the housing at its outer end on the casing, means for adjusting said second mentioned vanes toward and away from the first mentioned vanes, and means for driving said last mentioned vanes by said housing in a direction opposite to the rotative movement of the stator and housing, to thereby vary the rotation of the rotor, progressively increasing said rotation as the rotatable vane carrying member and the vanes thereon are moved toward the first mentioned vanes.

3. In an electric motor, a casing having a horizontal body and vertical ends, a rotor having a horizontal shaft extending from both ends thereof, one portion of which extends through and rotatably mounted on one end of the casing, a stator having a frame within which the rotor is located, said shaft at the opposite end of the rotor being rotatably mounted on the opposite end of the stator, a housing mounted at its outer end for rotation with the opposite end of the casing and fixedly secured to the adjacent end of the stator, hydraulic means within said housing for interposing a brake upon rotation of said housing and stator, and manually operable means for adjusting said hydraulic means to progressively vary the degree of braking, as and for the purposes described.

4. In an electric motor, an elongated casing having vertical closing ends, a rotor within the casing, a shaft at one end of the rotor extending through and rotatably mounted on one end of the casing, a housing located within and adjacent the opposite ends of the casing, a sleeve secured to said opposite end of the casing extending inwardly and secured to said casing against rotation, said sleeve extending into the outer end of the housing with said housing rotatably mounted thereon, a stator including two spaced apart forks, one permanently connected to the inner side of said housing and the other rotatably mounted on the fork of the stator on which the housing is connected, the axis of the rotor shaft and of said sleeve being coincident, an arm secured to said sleeve within the housing, a pinion rotatably mounted at the outer end of the arm, said housing having a continuous series of annular gear teeth with which said pinion meshes, a gear rotatably mounted on said sleeve in mesh with said pinion, a chambered disk structure having spaced apart inner and outer vertical sides and a cylindrical wall to the outer side of which said gear is connected, a plate within said disk, spring means normally moving said plate to lie against the outer side of the disk, a plurality of vanes extending from said plate through the opposite side of the disk, a screw threaded rod passing through said sleeve and adapted to be turned to move said plate and vanes thereon against the force of said spring, said housing having a plurality of radially located vanes extending from its inner side toward the first mentioned vanes and toward which said first mentioned vanes are movable on operation of said rod against the force of the spring.

BENEDICT R. GERULIS.
HENRY GARVELINK.

REFERENCES CITED

The following references are of record in the file of this patent:

UNITED STATES PATENTS

| Number | Name | Date |
|---|---|---|
| 474,857 | Phillips | May 17, 1892 |
| 724,827 | Eastwood | Apr. 7, 1903 |
| 2,249,671 | Skowron | July 15, 1941 |